(No Model.) 2 Sheets—Sheet 1.

J. MITTELSTENSCHEID & A. MEMMLER.
VALVE AND COCK.

No. 305,948. Patented Sept. 30, 1884.

Witnesses
William Miller
Otto Hupeland

Inventors
Julius Mittelstenscheid
August Memmler
By Van Santvoord & Hauff
Attorneys (No Model.) 2 Sheets—Sheet 2.

J. MITTELSTENSCHEID & A. MEMMLER.
VALVE AND COCK.

No. 305,948. Patented Sept. 30, 1884.

Witnesses
William Miller
Otto Hufeland

Inventors
Julius Mittelstenscheid
August Memmler
by Van Santvoord & Hauff
Attorneys

UNITED STATES PATENT OFFICE.

JULIUS MITTELSTENSCHEID AND AUGUST MEMMLER, OF DUSSELDORF, GERMANY.

VALVE AND COCK.

SPECIFICATION forming part of Letters Patent No. 305,948, dated September 30, 1884.

Application filed February 28, 1884. (No model.) Patented in Germany June 6, 1882, No. 21,905; in Belgium June 30, 1883, No. 61,754, and in France September 29, 1883, No. 145,406.

*To all whom it may concern:*

Be it known that we, JULIUS MITTELSTENSCHEID and AUGUST MEMMLER, subjects of the Emperor of Germany, residing at Dusseldorf, in the Empire of Germany, have invented new and useful Improvements in Valves and Cocks, of which the following is a specification.

This invention consists in so constructing the head or cap of a valve or cock that the entire closing or valve mechanism is contained or inclosed in said head or cap, whereby repairing of the valve or cock is facilitated, as hereinafter more fully set forth.

Figure 1:
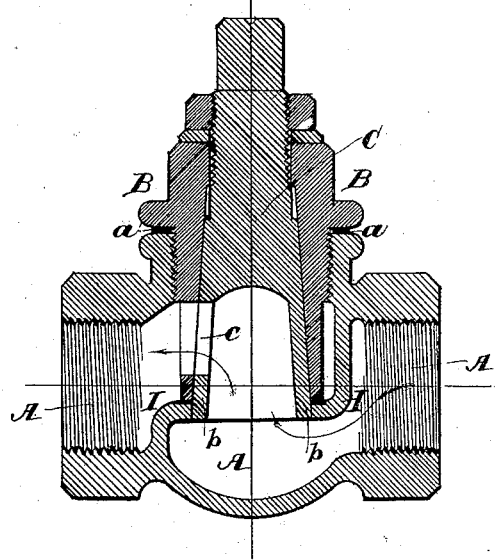
Figure 2:
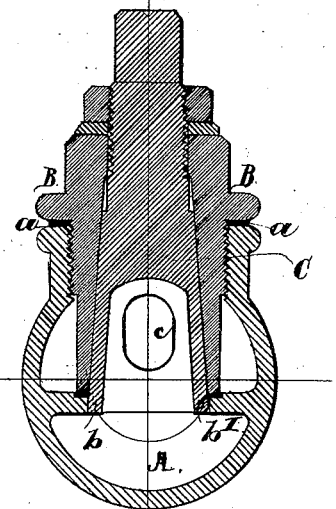
Figure 3:
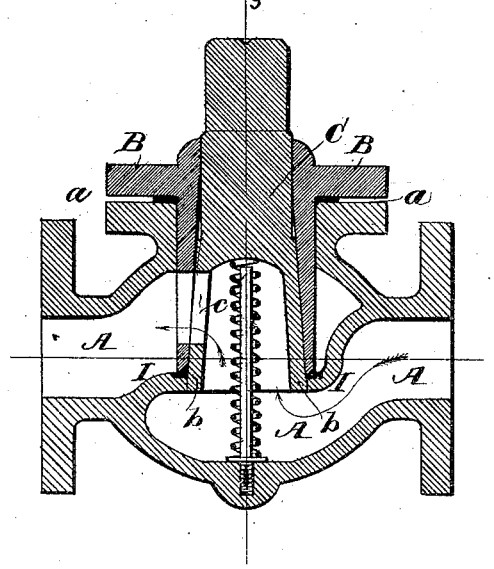
Figure 4:
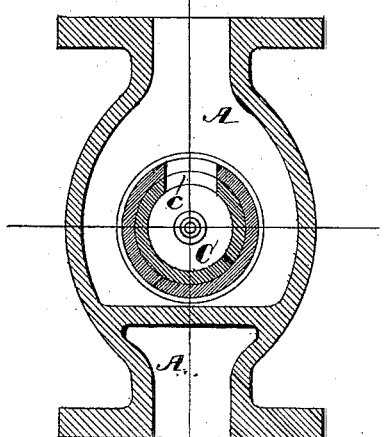
Figure 1:
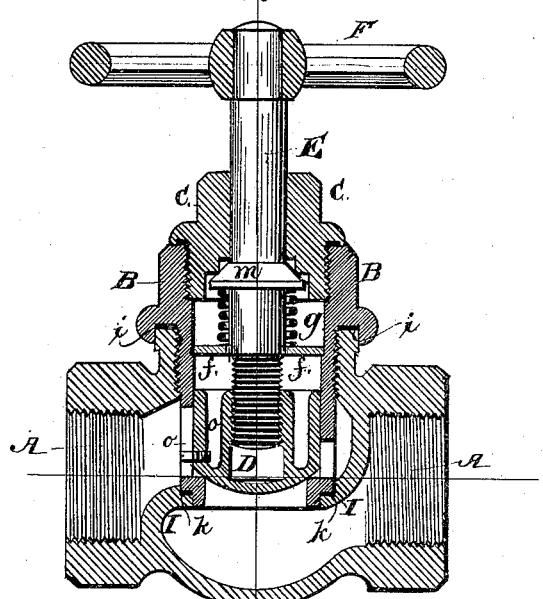
Figure 2:
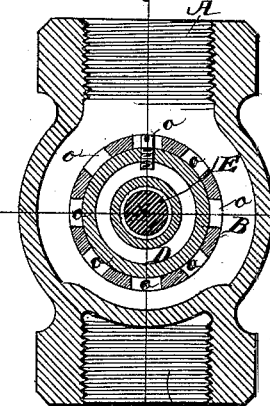
Figure 3:
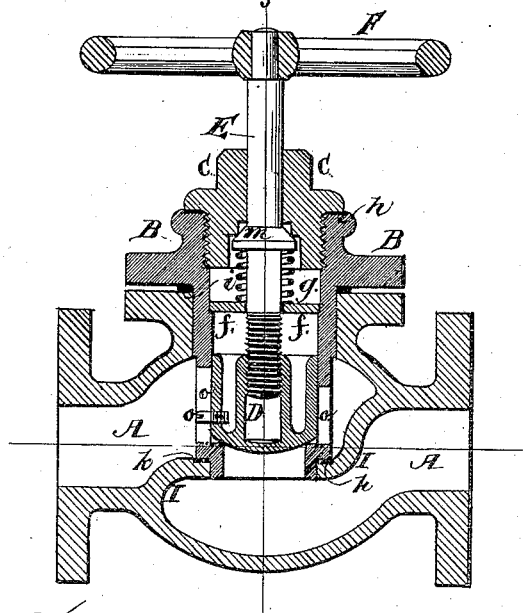
Figure 4:
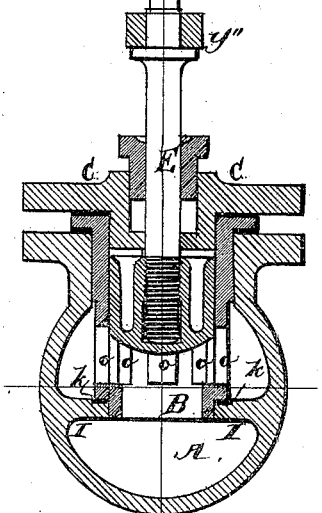

This invention is illustrated in the accompanying drawings, in Sheet 1 of which Figure 1 represents a vertical longitudinal section of a stop-cock. Fig. 2 represents a vertical transverse section of the same. Fig. 3 represents also a longitudinal section of a stop-cock. Fig. 4 represents a horizontal section of the same. Sheet 2 represents a modification in the construction of our improved valve, the principle remaining the same, and Fig. 1 in Sheet 2 represents a vertical longitudinal section of a screw-valve. Fig. 2 represents a horizontal section of the same. Fig. 3 represents a similar section as Fig. 1. Fig. 4 represents a vertical transverse section of the same with a stuffing-box.

Similar letters indicate corresponding parts.

A represents the casing or shell of the valve, and B represents the head or cap. The casing A is of similar construction in the devices of Sheets 1 and 2. The head or cap B is applied to the casing A either by being screwed into the same or by flange connection, or in any desired manner. To secure closing of the joints, washers (of lead, composition, or other suitable material) may be used, such washers being represented by the letters $a$ $b$ in Sheet 1, and by the letters $h$ $i$ $k$ in Sheet 2.

In the construction shown in Sheet 1 the head or cap B receives the spigot or plug C, and by making the opening $c$ in the spigot or plug correspond with a similar opening in the head or cap B a passage is secured.

In the case of the screw-valve shown in Sheet 2, the head or cap B is provided with a flange or shoulder, forming the seat for the valve.

The letter $o$ indicates openings or perforations for securing a passage, and $o'$ indicates a lug or projection which prevents turning of the valve D. The valve D receives the screw end of the spindle E, a hand-wheel, F, being provided to operate the device. The flange or shoulder $m$ on the spindle E serves for closing the chamber and guarding against escape of contents of the valve-chamber.

The spiral springs shown in Sheets 1 and 2 serve to keep the valve or spigot, or the valve stem or spindle E, pressed closely into its seat in the case when pressure from within is wanting. These springs, in the case of the device shown in Sheet 1, press against the casing A and against the plug C, and in the case of the device shown in Sheet 2, such springs press against the shoulder $m$ of the spindle E and against the disk $f$, which disk may be loosely placed into the cap B.

In Fig. 4, Sheet 2, is represented a construction of valve in which the spindle E has its support or bracing-point in a fixed arm, $y$, which is placed in a fixed position outside the casing A.

The peculiar feature of the devices shown in Sheets 1 and 2 is that the cap or head B is made to contain the entire closing or valve mechanism, including the valve-seat, so that a repairing of the device is easily accomplished by removing the cap B from the casing A and inserting therefor another cap, all wear of the casing A being avoided. The device is thus readily and easily kept in working order, and a saving of time and labor is accomplished. The inner end of the cap B is supported or braced by a diaphragm or partition, I, in the valve shell or casing A, whereby the cap B is held firm and steady and prevented from wearing loose.

Another advantage of the diaphragm I is that the cap B, in order to be braced or steadied, does not have to be extended so as to abut with its inner end against the wall of the shell A, thus saving material and cheapening the construction. The diaphragm I also strengthens the shell A and renders it less liable to be ruptured or broken.

What we claim as new, and desire to secure by Letters Patent, is—

1. The combination, with the casing A and head or cap B, inclosing the valve mechanism, of a packing-spring, $g$, substantially as set forth.

2. The combination, with the casing A, provided with a diaphragm or partition, I, and the head or cap B, inclosing the valve mechanism and braced by said diaphragm or partition, of a packing-spring, $g$, substantially as set forth.

In testimony whereof we have hereunto set our hands and seals in the presence of two subscribing witnesses.

JUL. MITTELSTENSCHEID. [L. S.]
AUG. MEMMLER. [L. S.]

Witnesses:
   J. E. MAXFIELD,
   WALTER TUNGANG.